(12) United States Patent
Sun et al.

(10) Patent No.: US 9,573,477 B2
(45) Date of Patent: *Feb. 21, 2017

(54) METHOD AND DEVICE FOR CHARGING ELECTRIC VEHICLE IN POWER SYSTEM

(71) Applicant: Tsinghua University, Beijing (CN)

(72) Inventors: Hongbin Sun, Beijing (CN); Qinglai Guo, Beijing (CN); Boming Zhang, Beijing (CN); Wenchuan Wu, Beijing (CN); Zhengshuo Li, Beijing (CN); Shujun Xin, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 245 days.

This patent is subject to a terminal disclaimer.

(21) Appl. No.: 14/461,339

(22) Filed: Aug. 15, 2014

(65) Prior Publication Data

US 2015/0145478 A1 May 28, 2015

(30) Foreign Application Priority Data

Nov. 28, 2013 (CN) .......................... 2013 1 0625091

(51) Int. Cl.
*H02J 7/00* (2006.01)
*B60L 11/18* (2006.01)

(52) U.S. Cl.
CPC ........ *B60L 11/1816* (2013.01); *B60L 11/1844* (2013.01); *B60L 11/1846* (2013.01); *B60L 11/1861* (2013.01); *B60L 2240/80* (2013.01); *B60L 2250/14* (2013.01); *B60L 2260/50* (2013.01); *Y02E 60/721* (2013.01); *Y02T 10/7005* (2013.01); *Y02T 10/705* (2013.01); *Y02T 10/7044* (2013.01);

(Continued)

(58) Field of Classification Search
CPC ......... G05B 15/02; H02J 3/14; H02J 13/0062; H02J 13/001; H02J 2003/007; H02J 3/008; H02J 3/32; H02J 13/0006; H02J 2003/146; H02J 7/0054; H02J 7/0055; H02J 3/381; H02J 3/383; H02J 7/0052; H02J 13/0079; H02J 2003/143; H02J 7/35; H02J 2003/003; H02J 13/0086; H02J 2003/001
USPC ................................................ 320/108–116
See application file for complete search history.

(56) References Cited

U.S. PATENT DOCUMENTS

2011/0025267 A1* 2/2011 Kamen ................... B60L 8/003
320/109
2013/0229149 A1* 9/2013 Sortomme ................ H02J 7/00
320/109

* cited by examiner

*Primary Examiner* — Binh Tat
(74) *Attorney, Agent, or Firm* — Kile Park Reed & Houtteman PLLC (57) ABSTRACT

A method and a device for charging an electric vehicle in a power system are provided. The method includes: obtaining a plurality of electric vehicles connected to the power system at a dispatching time, and obtaining a rated charging power and a charging requirement at the dispatching time; determining a charging period corresponding to the plurality of electric vehicles; determining a forecast period, and obtaining a charging requirement, a remaining charging energy capacity and a maximum charging power; establishing a charging model of the plurality of electric vehicles, establishing a first constraint of the charging model, and establishing a second constraint of the charging model; and solving the charging model under the first constraint and the second constraint to obtain an optimal charging power of each electric vehicle at each charging time in the charging period so as to charge each electric vehicle under the optimal charging power.

9 Claims, 2 Drawing Sheets

(52) U.S. Cl.
CPC .......... *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

METHOD AND DEVICE FOR CHARGING ELECTRIC VEHICLE IN POWER SYSTEM

CROSS-REFERENCE TO RELATED APPLICATION

This application claims priority to and benefits of Chinese Patent Application Serial No. 201310625091.3, filed with the State Intellectual Property Office of P. R. China on Nov. 28, 2013, the entire content of which is incorporated herein by reference.

FIELD

The present disclosure relates to a power system field, and more particularly to a method for charging an electric vehicle in a power system and a device for charging an electric vehicle in a power system.

BACKGROUND

Currently, the electric vehicle has been developed rapidly as the representative of the clean energy vehicle. However, there are some problems in the rapid development of the electric vehicle: the electric vehicle will influence the power system to a great extent when the number of the electric vehicles reaches a certain size and the electric vehicles are connected to the power system disorderly. For example, the power quality can be declined, the loss of the system power can be increased, and even the stability of the power system can be endangered. Therefore, it is necessary to optimize the charging behavior of the electric vehicle to avoid the above described effects, and to achieve that the charging power may be increased during the trough of the power system and may be decreased during the peak of the power system.

SUMMARY

Embodiments of the present disclosure seek to solve at least one of the problems existing in the related art to at least some extent.

According to a first aspect of the present disclosure, a method for charging an electric vehicle in a power system is provided. The method comprises the steps of: obtaining a plurality of electric vehicles connected to the power system at a dispatching time, and obtaining a rated charging power and a charging requirement of each electric vehicle at the dispatching time respectively; determining a charging period corresponding to the plurality of electric vehicles; determining a forecast period, and obtaining a charging requirement, a remaining charging energy capacity and a maximum charging power at each charging time in the forecast period corresponding to a set of electric vehicles to be connected to the power system in the forecast period; establishing a charging model of the plurality of electric vehicles, establishing a first constraint of the charging model according to the rated charging power and the charging requirement at the dispatching time of each electric vehicle, and establishing a second constraint of the charging model according to the charging requirement, the remaining charging energy capacity and the maximum charging power of the set at each charging time in the forecast period; and solving the charging model under the first constraint and the second constraint to obtain an optimal charging power of each electric vehicle at each charging time in the charging period, and sending the optimal charging power at the dispatching time to each electric vehicle so as to charge each electric vehicle under the optimal charging power.

With the method for charging the electric vehicle in the power system according to embodiments of the present disclosure, the operating state of the power system and electric vehicles at each charging time in the forecast period at the dispatching time is considered, the predicted data about the charging behavior corresponding to the set of electric vehicles to be connected to the power system is used. Therefore, the effectiveness of the real-time charging can be improved, the charging power may be increased during the trough of the power system and may be decreased during the peak of the power system and the efficiency of power system may be increased and a good robustness is guaranteed. For example, in the case that the predicted error of the set of electric vehicles is within ±15%, the present method still has a significant improvement.

According to a second aspect of the present disclosure, a device for charging an electric vehicle in a power system is provided. The device comprises: a first obtaining module, configured for obtaining a plurality of electric vehicles connected to the power system at a dispatching time, and obtaining a rated charging power and a charging requirement of each electric vehicle at the dispatching time respectively; a first determining module, configured for determining a charging period corresponding to the plurality of electric vehicles; a second determining module, configured for determining a forecast period, in which the forecast period is less than or equal to the charging period; a second obtaining module, configured for obtaining a charging requirement, a remaining charging energy capacity and a maximum charging power at each charging time in the forecast period corresponding to a set of electric vehicles being connected to the power system in the forecast period; an establishing module, configured for establishing a charging model of the plurality of electric vehicles, establishing a first constraint of the charging model according to the rated charging power and the charging requirement at the dispatching time of each electric vehicle, and establishing a second constraint of the charging model according to the charging requirement, the remaining charging energy capacity and the maximum charging power of the set at each charging time in the forecast period; a solving module, configured for solving the charging model under the first constraint and the second constraint to obtain an optimal charging power of each electric vehicle at each charging time in the charging period; and a sending module, configured for sending the optimal charging power at the dispatching time to each electric vehicle so as to charge each electric vehicle under the optimal charging power.

With the device for charging the electric vehicle in the power system according to embodiments of the present disclosure, the operating state of the power system and electric vehicles at each charging time in the forecast period at the dispatching time is considered, the predicted data about the charging behavior corresponding to the set of electric vehicles to be connected to the power system is used. Therefore, the effectiveness of the real-time charging can be improved, the charging power may be increased during the trough of the power system and may be decreased during the peak of the power system and the efficiency of power system may be increased and a good robustness is guaranteed. For example, in the case that the predicted error of the set of electric vehicles is within ±15%, the present method still has a significant improvement.

According to a third aspect of the present disclosure, a computer readable storage medium is provided. The computer readable storage medium comprises a computer program for executing the steps of: obtaining a plurality of electric vehicles connected to the power system at a dispatching time, and obtaining a rated charging power and a charging requirement of each electric vehicle at the dispatching time respectively; determining a charging period corresponding to the plurality of electric vehicles; determining a forecast period, and obtaining a charging requirement, a remaining charging energy capacity and a maximum charging power at each charging time in the forecast period corresponding to a set of electric vehicles being connected to the power system in the forecast period; establishing a charging model of the plurality of electric vehicles, establishing a first constraint of the charging model according to the rated charging power and the charging requirement at the dispatching time of each electric vehicle, and establishing a second constraint of the charging model according to the charging requirement, the remaining charging energy capacity and the maximum charging power of the set at each charging time in the forecast period; and solving the charging model under the first constraint and the second constraint to obtain an optimal charging power of each electric vehicle at each charging time in the charging period, and sending the optimal charging power at the dispatching time to each electric vehicle so as to charge each electric vehicle under the optimal charging power.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the following, a method for charging an electric vehicle in a power system according to embodiments of the present disclosure will be described in detail with reference to the drawings.

Figure 1:
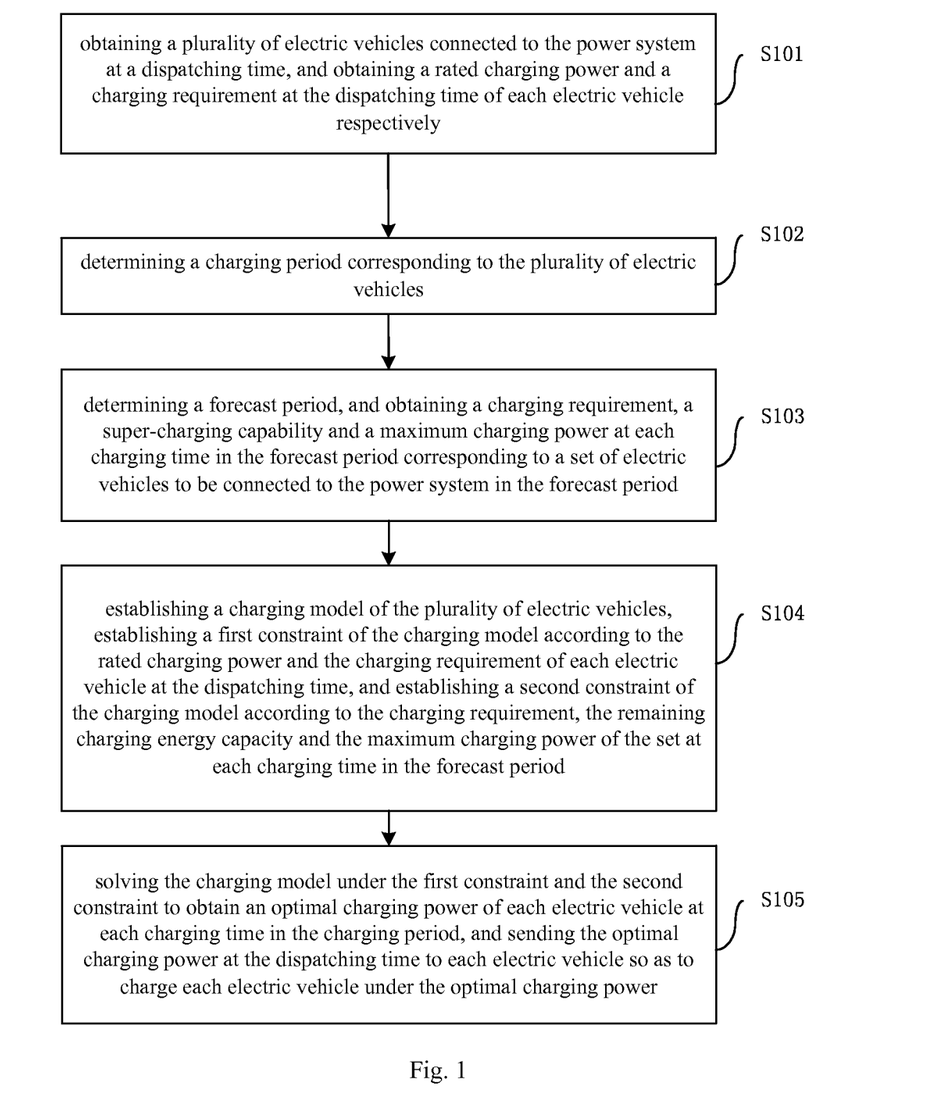
FIG. 1 is a flow chart of a method for charging an electric vehicle in a power system according to an embodiment of the present disclosure.

FIG. 1 is a flow chart of a method for charging an electric vehicle in a power system according to an embodiment of the present disclosure.

As shown in FIG. 1, the method includes the following steps.

At step 101, a plurality of electric vehicles connected to the power system at a dispatching time is obtained, and a rated charging power and a charging requirement at the dispatching time of each electric vehicle are obtained respectively.

In some embodiments, a connected time of each electric vehicle is less than or equal to the dispatching time, the departure time of each electric vehicle is greater than the dispatching time, and the charging requirement at the dispatching time of each electric vehicle is greater than 0. Specifically, firstly, at the dispatching time, the electric vehicles connected to the power system are obtained from the power system control center, meanwhile the connected time, the departure time, the rated charging power and the charging requirement at the dispatching time of each electric vehicle are obtained, in which, the charging requirement is net charging requirement at the dispatching time; then, each electric vehicle is selected according to the connected time, the departure time and the first charging requirement at the dispatching time, which is expressed according to formula (1), $$M_t = \{n \in N | t_n^{in} \leq t < t_n^{out}, R_n^t > 0\} \quad (1)$$

where $M_t$ represents the plurality of electric vehicles, t represents the dispatching time, N represents the number of the plurality of electric vehicles, n represents the $n^{th}$ electric vehicle, $t_n^{in}$ represents the connected time of the $n^{th}$ electric vehicle, $t_n^{out}$ represents the departure time of the $n^{th}$ electric vehicle, $R_n^t$ represents the charging requirement of the $n^{th}$ electric vehicle.

At step 102, a charging period corresponding to the plurality of electric vehicles is determined.

In some embodiments, step 102 includes the following steps: a latest departure time from departure times when each electric vehicle leaves the power system is obtained, and a period which is from the dispatching time to the latest departure time is taken as the charging period, in which each charging time in the charging period is greater than or equal to the dispatching time and is less than or equal to the latest departure time, which is expressed according to formula (2), $$\Omega_t = \left\{ k \mid t \leq k \leq \max_{n \in M_t} t_n^{out} \right\} \quad (2)$$

where $\Omega_t$ represents the charging period, k represents the $k^{th}$ charging time in the charging period, n represents the $n^{th}$ electric vehicle, $M_t$ represents the plurality of electric vehicles, $t_n^{out}$ represents the departure time of the $n^t$ electric vehicle.

At step 103, a forecast period is determined, and a charging requirement, a remaining charging energy capacity and a maximum charging power at each charging time in the forecast period corresponding to a set of electric vehicles to be connected to the power system in the forecast period are obtained.

In some embodiments, each charging time in the forecast period is greater than or equal to a next dispatching time and is less than or equal to the latest departure time, which is expressed according to formula (3), $$T_t^p = \left\{ k \mid t+1 \leq k \leq \max_{n \in M_t} t_n^{out} \right\} \quad (3)$$

where $T^p$ represents the forecast period, t represents the dispatching time, k represents the $k^{th}$ charging time in the forecast period, $M^t$ represents the plurality of electric vehicles, n represents the $n^{th}$ electric vehicle, $t_n^{out}$ represents the departure time of the $n^{th}$ electric vehicle.

At step 104, a charging model of the plurality of electric vehicles is established, a first constraint of the charging model according to the rated charging power and the charging requirement of each electric vehicle at the dispatching time is established, and a second constraint of the charging model according to the charging requirement, the remaining charging energy capacity and the maximum charging power of the set at each charging time in the forecast period is established.

In some embodiments, the charging model is expressed according to formula (4), $$\min_{r^p, r_n, n \in M_t} \left\{ \left( \sum_{n \in M_t} r_n(t) + D^0(t) \right)^2 + \sum_{k \in T_t^p} \left( \sum_{n \in M_t} r_n(k) + r^p(k) + D^0(k) \right)^2 \right\} \quad (4)$$

$$\text{s.t.} \quad (I) \begin{cases} 0 \leq r_n(k) \leq r_n^{max}, & k \in \Omega_t, n \in M_t \\ \sum_{k \in \Omega_t} r_n(k) \Delta t = R_n^t, & n \in M_t \end{cases}$$

$$(II) \begin{cases} 0 \leq r^p(k) \leq \hat{r}^p(k), & k \in T_t^p \\ \sum_{l=t+1}^{k} r^p(l) \Delta t \geq \sum_{l'=t+1}^{k} \hat{R}^p(l), & k \in T_t^p \\ \sum_{l=t+1}^{k} r^p(l) \Delta t - \sum_{l=t+1}^{k} \hat{R}^p(l) \leq \hat{R}_D^p(k), & k \in T_t^p \end{cases}$$

where t represents the dispatching time, $M_t$ represents a plurality of electric vehicles, n represents the $n^{th}$ electric vehicle, $r^p$ represents the charging requirement of the set in the forecast period, $r_n$ represents the optimal charging power of the $n^{th}$ electric vehicle, k represents the $k^{th}$ charging time, $r_n(k)$ represents the optimal charging power of the $n^{th}$ electric vehicle at the $k^{th}$ charging time, $D^0(k)$ represents the a conventional load power at the $k^{th}$ charging time of the power system, $r^p(k)$ represents the charging requirement of the set at the $k^{th}$ charging time, $\Omega_t$ represents the charging period, $T_t^p$ represents the forecast period, $r_n^{max}$ represents the rated charging power of the $n^{th}$ electric vehicle, $R_n^t$ represents the charging requirement of the $n^{th}$ electric vehicle at the $k^{th}$ charging time, $\Delta t$ represents an interval between two charges, $\hat{r}^p(k)$ represents the maximum charging power of the set at the $k^{th}$ charging time, $\hat{R}^p(k)$ represents the remaining charging energy capacity of the set at the $k^{th}$ charging time, $\hat{R}_D^p(k)$ represents the maximum charging power of the set at the $k^{th}$ charging time.

At step 105, the charging model is solved under the first constraint and the second constraint to obtain an optimal charging power of each electric vehicle at each charging time in the charging period, and the optimal charging power at the dispatching time is sent to each electric vehicle so as to charge each electric vehicle under the optimal charging power.

With the method for charging the electric vehicle in the power system according to embodiments of the present disclosure, the operating state of the power system and electric vehicles at each charging time in the forecast period at the dispatching time is considered, the predicted data about the charging behavior corresponding to the set of electric vehicles to be connected to the power system is used. Therefore, the effectiveness of the real-time charging can be improved, the charging power may be increased during the trough of the power system and may be decreased during the peak of the power system and the efficiency of power system may be increased and a good robustness is guaranteed. For example, in the case that the predicted error of the set of electric vehicles is within ±15%, the present method still has a significant improvement.

In the following, a device for charging an electric vehicle in a power system according to embodiments of the present disclosure will be described in detail with reference to the drawings.

Figure 2:
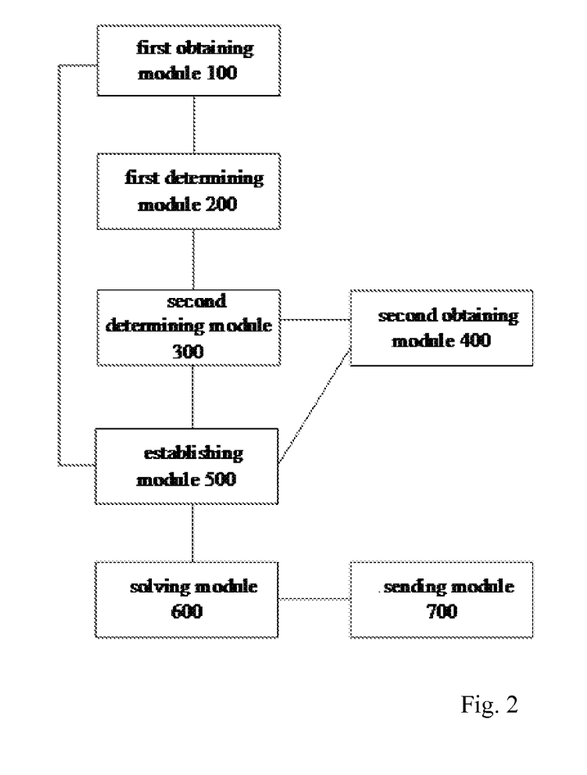
FIG. 2 is a block diagram of a device for charging an electric vehicle in a power system according to an embodiment of the present disclosure.

FIG. 2 is a block diagram of a device for charging an electric vehicle in a power system according to an embodiment of the present disclosure.

As shown in FIG. 2, the device comprises a first obtaining module 100, a first determining module 200, a second determining module 300, a second obtaining module 400, a establishing module 500, a solving module 600 and a sending module 700.

Specifically, the first obtaining module 100 is configured for obtaining a plurality of electric vehicles connected to the power system at a dispatching time, and obtaining a rated charging power and a charging requirement of each electric vehicle at the dispatching time respectively.

In some embodiments, a connected time of each electric vehicle is less than or equal to the dispatching time, the departure time of each electric vehicle is greater than the dispatching time, and the charging requirement at the dispatching time of each electric vehicle is greater than 0. Specifically, firstly, at the dispatching time, the first obtaining module 100 obtains the electric vehicles connected to the power system from the power system control center, meanwhile obtains the connected time, the departure time, the rated charging power and the charging requirement of each electric vehicle at the dispatching time, in which, the charging requirement is net charging requirement at the dispatching time; then, the first obtaining module 100 selects each electric vehicle according to the connected time, the departure time and the first charging requirement at the dispatching time, which is expressed according to formula (1), $$M_t = \{ n \in N \mid t_n^{in} \leq t < t_n^{out}, R_n^t \geq 0 \} \quad (1)$$

where $M_t$ represents the plurality of electric vehicles, t represents the dispatching time, N represents the number of the plurality of electric vehicles, n represents the $n^{th}$ electric vehicle, $t_n^{in}$ represents the connected time of the $n^{th}$ electric vehicle, $t_n^{out}$ represents the departure time of the $n^{th}$ electric vehicle, $R_n^t$ represents the charging requirement of the $n^{th}$ electric vehicle.

The first determining module is configured for determining a charging period corresponding to the plurality of electric vehicles.

In some embodiments, the first determining module 100 is further configured for: selecting a latest departure time from departure times when each electric vehicle leaves the power system, and taking a period which is from the dispatching time to the latest departure time as the charging period, in which each charging time in the charging period is greater than or equal to the dispatching time and is less than or equal to the latest departure time, which is expressed according to formula (2), $$\Omega_t = \left\{ k \mid t \le k \le \max_{n \in M_t} t_n^{out} \right\} \quad (2)$$

where $\Omega_t$ represents the charging period, k represents the $k^{th}$ charging time in the charging period, n represents the $n^{th}$ electric vehicle, $M_t$ represents the plurality of electric vehicles, $t_n^{out}$ represents the departure time of the $n^{th}$ electric vehicle.

The second determining module is configured for determining a forecast period, in which the forecast period is less than or equal to the charging period.

In some embodiments, each charging time in the forecast period is greater than or equal to a next dispatching time and is less than or equal to the latest departure time, which is expressed according to formula (3), $$T_t^p = \left\{ k \mid t+1 \le k \le \max_{n \in M_t} t_n^{out} \right\} \quad (3)$$

where $T_t^p$ represents the forecast period, t represents the dispatching time, k represents the $k^{th}$ charging time in the forecast period, $M_t$ represents the plurality of electric vehicles, n represents the $n^{th}$ electric vehicle, $t_n^{out}$ represents the departure time of the $n^{th}$ electric vehicle.

The second obtaining module 400 is configured for obtaining a charging requirement, a remaining charging energy capacity and a maximum charging power at each charging time in the forecast period corresponding to a set of electric vehicles being connected to the power system in the forecast period.

The establishing module 500 is configured for establishing a charging model of the plurality of electric vehicles, establishing a first constraint of the charging model according to the rated charging power and the charging requirement at the dispatching time of each electric vehicle, and establishing a second constraint of the charging model according to the charging requirement, the remaining charging energy capacity and the maximum charging power of the set at each charging time in the forecast period.

In some embodiments, the charging model is expressed according to formula (4), $$\min_{r^p, r_n, n \in M_t} \left\{ \left( \sum_{n \in M_t} r_n(t) + D^0(t) \right)^2 + \right. \quad (4)$$

-continued $$\left. \sum_{k \in T_t^p} \left( \sum_{n \in M_t} r_n(k) + r^p(k) + D^0(k) \right)^2 \right\}$$

$$\text{s.t. } (I) \begin{cases} 0 \le r_n(k) \le r_n^{max}, & k \in \Omega_t, n \in M_t \\ \sum_{k \in \Omega_t} r_n(k) \Delta t = R_n^t, & n \in M_t \end{cases}$$

$$(II) \begin{cases} 0 \le r^p(k) \le \hat{P}^p(k), & k \in T_t^p \\ \sum_{l=t+1}^{k} r^p(l) \Delta t \ge \sum_{\tau'=t+1}^{k} \hat{R}^p(l), & k \in T_t^p \\ \sum_{l=t+1}^{k} r^p(l) \Delta t - \sum_{l=t+1}^{k} \hat{R}^p(l) \le \hat{R}_D^p(k), & k \in T_t^p \end{cases}$$

where t represents the dispatching time, $M_t$ represents a plurality of electric vehicles, n represents the $n^{th}$ electric vehicle, $r^p$ represents the charging requirement of the set in the forecast period, $r_n$ represents the optimal charging power of the $n^{th}$ electric vehicle, k represents the $k^{th}$ charging time, $r_n(k)$ represents the optimal charging power of the $n^{th}$ electric vehicle at the $k^{th}$ charging time, $D^0(k)$ represents the a conventional load power at the $k^{th}$ charging time of the power system, $r^p(k)$ represents the charging requirement of the set at the $k^{th}$ charging time, $\Omega_t$ represents the charging period, $T_t^p$ represents the forecast period, $r_n^{max}$ represents the rated charging power of the $n^{th}$ electric vehicle, $R_n^t$ represents the charging requirement of the $n^{th}$ electric vehicle at the $k^{th}$ charging time, $\Delta t$ represents an interval between two charges, $\hat{P}^p(k)$ represents the maximum charging power of the set at the $k^{th}$ charging time, $\hat{R}^p(k)$ represents the remaining charging energy capacity of the set at the $k^{th}$ charging time, $\hat{R}_D^p(k)$ represents the maximum charging power of the set at the $k^{th}$ charging time.

The solving module 600 is configured for solving the charging model under the first constraint and the second constraint to obtain an optimal charging power of each electric vehicle at each charging time in the charging period.

The sending module 700 is configured for sending the optimal charging power at the dispatching time to each electric vehicle so as to charge each electric vehicle under the optimal charging power.

With the device for charging the electric vehicle in the power system according to embodiments of the present disclosure, the operating state of the power system and electric vehicles at each charging time in the forecast period at the dispatching time is considered, the predicted data about the charging behavior corresponding to the set of electric vehicles to be connected to the power system is used. Therefore, the effectiveness of the real-time charging can be improved, the charging power may be increased during the trough of the power system and may be decreased during the peak of the power system and the efficiency of power system may be increased and a good robustness is guaranteed. For example, in the case that the predicted error of the set of electric vehicles is within ±15%, the present method still has a significant improvement.

In the following, computer readable storage medium according to embodiments of the present disclosure will be described in detail.

In some embodiments, the computer readable storage medium, comprising a computer program for executing steps of: a plurality of electric vehicles connected to the power system at a dispatching time is obtained, and a rated charging power and a charging requirement of each electric vehicle at the dispatching time are obtained respectively; a charging period corresponding to the plurality of electric vehicles is determined; a forecast period is determined, and a charging requirement, a remaining charging energy capacity and a maximum charging power at each charging time in the forecast period corresponding to a set of electric vehicles to be connected to the power system in the forecast period are obtained; a charging model of the plurality of electric vehicles is established, a first constraint of the charging model according to the rated charging power and the charging requirement at the dispatching time of each electric vehicle is established, and a second constraint of the charging model according to the charging requirement, the remaining charging energy capacity and the maximum charging power of the set at each charging time in the forecast period is established; and the charging model is solved under the first constraint and the second constraint to obtain an optimal charging power of each electric vehicle at each charging time in the charging period, and the optimal charging power at the dispatching time is sent to each electric vehicle so as to charge each electric vehicle under the optimal charging power.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

One or more elements of the device for charging the electric vehicle in the power system and any acts of the methods disclosed herein may be implemented, for example, on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a non-transitory computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor. For example one or more parts of the system may be implemented by a computer processor with associated memory and timing circuitry (not separately shown) that is a functional part of the system and is activated by, and facilitates functionality of other components or parts of the system.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for charging an electric vehicle in a power system, comprising:
   obtaining a plurality of electric vehicles connected to the power system at a dispatching time, and obtaining a rated charging power and a charging requirement at the dispatching time of each electric vehicle respectively;
   determining a charging period corresponding to the plurality of electric vehicles;
   determining a forecast period, and obtaining a charging requirement, a remaining charging energy capacity and a maximum charging power at each charging time in the forecast period corresponding to a set of electric vehicles to be connected to the power system in the forecast period;
   establishing a charging model of the plurality of electric vehicles, establishing a first constraint of the charging model according to the rated charging power and the charging requirement of each electric vehicle at the dispatching time, and establishing a second constraint of the charging model according to the charging requirement, the remaining charging energy capacity and the maximum charging power of the set at each charging time in the forecast period; and
   solving the charging model under the first constraint and the second constraint to obtain an optimal charging power of each electric vehicle at each charging time in the charging period, and sending the optimal charging power at the dispatching time to each electric vehicle so as to charge each electric vehicle under the optimal charging power,
   wherein the charging model is expressed according to formula (1), $$\min_{r^P, r_n, n \in M_t} \left\{ \left( \sum_{n \in M_t} r_n(t) + D^0(t) \right)^2 + \sum_{k \in T_t^P} \left( \sum_{n \in M_t} r_n(k) + r^P(k) + D^0(k) \right)^2 \right\} \quad (1)$$

$$\text{s.t. } (I) \begin{cases} 0 \le r_n(k) \le r_n^{max}, & k \in \Omega_t, n \in M_t \\ \sum_{k \in \Omega_t} r_n(k) \Delta t = R_n^t, & n \in M_t \end{cases}$$

-continued $$(II) \begin{cases} 0 \le r^P(k) \le \hat{r}^P(k), & k \in T_t^P \\ \sum_{l=t+1}^{k} r^P(l) \Delta t \ge \sum_{\tau=t+1}^{k} \hat{R}^P(l), & k \in T_t^P \\ \sum_{l=t+1}^{k} r^P(l) \Delta t - \sum_{l=t+1}^{k} \hat{R}^P(l) \le \hat{R}_D^P(k), & k \in T_t^P \end{cases}$$

where t represents the dispatching time, $M_t$ represents a plurality of electric vehicles, n represents the $n^{th}$ electric vehicle, $r^P$ represents the charging requirement of the set in the forecast period, $r_n$ represents the optimal charging power of the $n^{th}$ electric vehicle, k represents the $k^{th}$ charging time, $r_n(k)$ represents the optimal charging power of the $n^{th}$ electric vehicle at the $k^{th}$ charging time, $D^0(k)$ represents a conventional load power at the $k^{th}$ charging time of the power system, $r^P(k)$ represents the charging requirement of the set at the $k^{th}$ charging time, $\Omega_t$ represents the charging period, $T_t^P$ represents the forecast period, $r_n^{max}$ represents the rated charging power of the $n^{th}$ electric vehicle, $R_n^t$ represents the charging requirement of the $n^{th}$ electric vehicle at the $k^{th}$ charging time, $\Delta t$ represents an interval between two charges, $\tilde{r}^P(k)$ represents the maximum charging power of the set at the $k^{th}$ charging time, $\hat{R}^P(k)$ represents the remaining charging energy capacity of the set at the $k^{th}$ charging time, $\hat{R}_D^P(k)$ represents the maximum charging power of the set at the $k^{th}$ charging time.

2. The method according to claim 1, wherein determining a charging period corresponding to the plurality of electric vehicles comprises:
   selecting a latest departure time from departure times when each electric vehicle leaves the power system, and taking a period which is from the dispatching time to the latest departure time as the charging period, in which each charging time in the charging period is greater than or equal to the dispatching time and is less than or equal to the latest departure time.

3. The method according to claim 2, wherein each charging time in the forecast period is greater than or equal to a next dispatching time and is less than or equal to the latest departure time.

4. The method according to claim 1, wherein a connected time of each electric vehicle is less than or equal to the dispatching time, the departure time of each electric vehicle is greater than the dispatching time, and the charging requirement at the dispatching time of each electric vehicle is greater than 0.

5. A device for charging an electric vehicle in a power system, comprising:
   a non-transitory memory comprising instructions stored thereon:
   a processor, configured by the instructions for performing and comprising:
      a first obtaining module, configured for obtaining a plurality of electric vehicles connected to the power system at a dispatching time, and obtaining a rated charging power and a charging requirement of each electric vehicle at the dispatching time respectively;
      a first determining module, configured for determining a charging period corresponding to the plurality of electric vehicles;
      a second determining module, configured for determining a forecast period, in which the forecast period is less than or equal to the charging period;

a second obtaining module, configured for obtaining a charging requirement, a remaining charging energy capacity and a maximum charging power at each charging time in the forecast period corresponding to a set of electric vehicles to be connected to the power system in the forecast period;

an establishing module, configured for establishing a charging model of the plurality of electric vehicles, establishing a first constraint of the charging model according to the rated charging power and the charging requirement of each electric vehicle at the dispatching time, and establishing a second constraint of the charging model according to the charging requirement, the remaining charging energy capacity and the maximum charging power of the set at each charging time in the forecast period;

a solving module, configured for solving the charging model under the first constraint and the second constraint to obtain an optimal charging power of each electric vehicle at each charging time in the charging period; and a sending module, configured for sending the optimal charging power at the dispatching time to each electric vehicle so as to charge each electric vehicle under the optimal charging power, wherein the charging model is expressed according to formula (1), $$\min_{r^P, r_n, n \in M_t} \left\{ \left( \sum_{n \in M_t} r_n(t) + D^0(t) \right)^2 + \sum_{k \in T_t^p} \left( \sum_{n \in M_t} r_n(k) + r^P(k) + D^0(k) \right)^2 \right\} \quad (1)$$

$$\text{s.t. } (I) \begin{cases} 0 \leq r_n(k) \leq r_n^{max}, & k \in \Omega_t, n \in M_t \\ \sum_{k \in \Omega_t} r_n(k) \Delta t = R_n^t, & n \in M_t \end{cases}$$

$$(II) \begin{cases} 0 \leq r^P(k) \leq \hat{r}^P(k), & k \in T_t^p \\ \sum_{l=t+1}^{k} r^P(l) \Delta t \geq \sum_{\tau=t+1}^{k} \hat{R}^P(l), & k \in T_t^p \\ \sum_{l=t+1}^{k} r^P(l) \Delta t - \sum_{l=t+1}^{k} \hat{R}^P(l) \leq \hat{R}_D^P(k), & k \in T_t^p \end{cases}$$

where t represents the dispatching time, $M_t$ represents a plurality of electric vehicles, n represents the $n^{th}$ electric vehicle, $r^P$ represents the charging requirement of the set in the forecast period, $r_n$ represents the optimal charging power of the $n^{th}$ electric vehicle, k represents the $k^{th}$ charging time, $r_n(k)$ represents the optimal charging power of the $n^{th}$ electric vehicle at the $k^{th}$ charging time, $D^0(k)$ represents a conventional load power at the $k^{th}$ charging time of the power system, $r^P(k)$ represents the charging requirement of the set at the $k^{th}$ charging time, $\Omega_t$ represents the charging period, $T_t^p$ represents the forecast period, $r_n^{max}$ represents the rated charging power of the $n^{th}$ electric vehicle, $R_n^t$ represents the charging requirement of the $n^{th}$ electric vehicle at the $k^{th}$ charging time, $\Delta t$ represents an interval between two charges, $\hat{r}^P(k)$ represents the maximum charging power of the set at the $k^{th}$ charging time, $\hat{R}^P(k)$ represents the remaining charging energy capacity of the set at the $k^{th}$ charging time, $\hat{R}_D^P(k)$ represents the maximum charging power of the set at the $k^{th}$ charging time.

6. The device according to claim 5, wherein the first determining module is further configured for:

selecting a latest departure time from departure times when each electric vehicle leaves the power system, and taking a period which is from the dispatching time to the latest departure time as the charging period, in which each charging time in the charging period is greater than or equal to the dispatching time and is less than or equal to the latest departure time.

7. The device according to claim 6, wherein each charging time in the forecast period is greater than or equal to a next dispatching time and is less than or equal to the latest departure time.

8. The device according to claim 5, wherein a connected time of each electric vehicle is less than or equal to the dispatching time, the departure time of each electric vehicle is greater than the dispatching time, and the charging requirement at the dispatching time of each electric vehicle is greater than 0.

9. A non-transitory computer readable storage medium, comprising a computer program for executing acts of:

obtaining a plurality of electric vehicles connected to the power system at a dispatching time, and obtaining a rated charging power and a charging requirement at the dispatching time of each electric vehicle respectively;

determining a charging period corresponding to the plurality of electric vehicles;

determining a forecast period, and obtaining a charging requirement, a remaining charging energy capacity and a maximum charging power at each charging time in the forecast period corresponding to a set of electric vehicles to be connected to the power system in the forecast period;

establishing a charging model of the plurality of electric vehicles, establishing a first constraint of the charging model according to the rated charging power and the charging requirement of each electric vehicle at the dispatching time, and establishing a second constraint of the charging model according to the charging requirement, the remaining charging energy capacity and the maximum charging power of the set at each charging time in the forecast period; and solving the charging model under the first constraint and the second constraint to obtain an optimal charging power of each electric vehicle at each charging time in the charging period, and sending the optimal charging power at the dispatching time to each electric vehicle so as to charge each electric vehicle under the optimal charging power, wherein the charging model is expressed according to formula (1), $$\min_{r^P, r_n, n \in M_t} \left\{ \left( \sum_{n \in M_t} r_n(t) + D^0(t) \right)^2 + \sum_{k \in T_t^p} \left( \sum_{n \in M_t} r_n(k) + r^P(k) + D^0(k) \right)^2 \right\} \quad (1)$$

$$\text{s.t. } (I) \begin{cases} 0 \leq r_n(k) \leq r_n^{max}, & k \in \Omega_t, n \in M_t \\ \sum_{k \in \Omega_t} r_n(k) \Delta t = R_n^t, & n \in M_t \end{cases}$$

$$(II) \begin{cases} 0 \leq r^p(k) \leq \hat{\bar{r}}^p(k), & k \in T_t^p \\ \sum_{l=t+1}^{k} r^p(l)\Delta t \geq \sum_{\tau=t+1}^{k} \hat{R}^p(l), & k \in T_t^p \\ \sum_{l=t+1}^{k} r^p(l)\Delta t - \sum_{l=t+1}^{k} \hat{R}^p(l) \leq \hat{R}_D^p(k), & k \in T_t^p \end{cases}$$

where t represents the dispatching time, $M_t$ represents a plurality of electric vehicles, n represents the $n^{th}$ electric vehicle, $r^p$ represents the charging requirement of the set in the forecast period, $r_n$ represents the optimal charging power of the $n^{th}$ electric vehicle, k represents the $k^{th}$ charging time, $r_n(k)$ represents the optimal charging power of the $n^{th}$ electric vehicle at the $k^{th}$ charging time, $D^0(k)$ represents a conventional load power at the $k^{th}$ charging time of the power system, $r^p(k)$ represents the charging requirement of the set at the $k^{th}$ charging time, $\Omega_t$ represents the charging period, $T_t^p$ represents the forecast period, $r_n^{max}$ represents the rated charging power of the $n^{th}$ electric vehicle, $R_n^t$ represents the charging requirement of the $n^{th}$ electric vehicle at the $k^{th}$ charging time, $\Delta t$ represents an interval between two charges, $\tilde{r}^p(k)$ represents the maximum charging power of the set at the $k^{th}$ charging time, $\hat{R}^p(k)$ represents the remaining charging energy capacity of the set at the $k^{th}$ charging time, $\hat{R}_D^p(k)$ represents the maximum charging power of the set at the $k^{th}$ charging time.

\* \* \* \* \*